Patented May 31, 1949

2,471,714

UNITED STATES PATENT OFFICE 2,471,714

STABILIZED DRY ROSIN SIZE COMPOSITION

Justus C. Barthel, Stamford, Arnold R. Davis, Riverside, and Edward Nichols Poor, Stamford, Conn., assignors to American Cyanamid Company, New York, N. Y., a corporation of Maine No Drawing. Application May 22, 1948, Serial No. 28,754

2 Claims. (Cl. 106—218)

This invention relates to rosin size compositions, and more particularly to dry rosin size compositions stabilized against oxidation.

Rosin sizes are usually produced by saponifying rosin with alkalies. In preparing liquid rosin sizes the rosin is usually heated with an aqueous solution of sodium or potassium carbonate, usually employing about 9–16% of the carbonate, based on the weight of the rosin, at about 190–212° F. for about 6 hours. In the preparation of dry rosin size the rosin is frequently reacted with about 9–12% of sodium or potassium hydroxide in the form of a relatively concentrated aqueous solution, which produces the dry size directly. Dry rosin size is also produced by subjecting the liquid size, prepared as described above, to evaporation on a drum drier or by spray-drying. Rosin sizes are prepared by the above procedures from either gum rosin or wood rosin.

The dry rosin sizes possess several advantages over liquid size solutions, particularly in shipment and storage, but are subject to oxidation with time. In some cases, especially with the spray-dried or other finely divided forms of saponified rosin, the rate of oxidation on storage may be so rapid that the considerable heat developed constitutes a serious fire hazard. The dry rosin sizes also tend to darken in color during storage and show increased foaming tendencies when added to paper stock suspensions because of oxidation.

In order to overcome these difficulties it has been proposed to add antioxidants to dry rosin size in order to retard or prevent oxidation upon storage. A wide variety of chemical compounds have been suggested for this purpose, but only a few of these have proven to be commercially feasible. The present invention is based on the discovery that phenothiazine is a particularly advantageous stabilizer for dry saponified rosin compositions.

We have found that phenothiazine and compounds closely related thereto are excellent antioxidants or stabilizers against oxidation for dry rosin size compositions when used in the relatively small quantities of from about 0.1% to about 1% by weight, based on the weight of the rosin used in making the size. Phenothiazine is particularly effective as an antioxidant for dry sizes prepared by the procedures outlined above. Our experiments have shown that comparable, but in most cases inferior, results are obtained with such compounds as phenoxazine, phenazine, tetrachlorophenothiazine, 4,8-diamino phenothiazine, and aliphatic-substituted phenothiazines such as 2-methyl phenothiazine, 2,4-dimethyl phenothiazine and 2,7-dimethyl phenothiazine. Phenothiazine itself is therefore the preferred antioxidant, and the present invention is directed specifically to dry rosin sizes stabilized against oxidation by the presence therein of an amount of this material sufficient to render the size composition substantially resistant to oxidation upon bulk storage in paper bags or other containers permitting access of air thereto.

Phenothiazine possesses the following advantages over other materials which have been tested as stabilizers for dry rosin size compositions. It is relatively cheap in cost and is available commercially in large quantities; it causes no discoloration of paper sized with rosin sizes containing it and causes only a very slight change in the color of the rosin size itself and it is sufficiently stable to permit incorporation into the rosin size composition during the manufacture thereof. The most important advantage of phenothiazine as a dry rosin size antioxidant, however, is the surprising fact that it appears to exhibit its maximum antioxidant properties at very low concentrations in the rosin size; in most cases quantities of 0.25–0.5% of phenothiazine, based on the weight of the rosin used in making the size, are as good or better than quantities of 0.75–1%.

The stabilized rosin size compositions of the present invention are preferably prepared by incorporating the requisite quantities of phenothiazine into the size during its manufacture. When dry size compositions are prepared directly by the reaction of rosin with concentrated sodium or potassium hydroxide solutions the phenothiazine may be mixed uniformly with the rosin before it is saponified or may be added along with the caustic solution. In the preparation of liquid sizes, using more dilute solutions of saponifying alkalies at elevated temperatures, the phenothiazine is usually added during the latter part of the saponification, preferably followed by sufficient agitation to obtain a uniform admixture.

It will be understood that phenothiazine from different sources may vary somewhat in its antioxidant properties, depending on its method of preparation and purity. With a very pure material, and with sizes prepared from rosin having only a relatively slow rate of oxidation such as those prepared from the darker grades of wood rosin as little as 0.1% of the antioxidant may be sufficient. On the other hand the addition of as much as 1% of a relatively crude phenothiazine may be advisable with some rosin sizes. Accordingly, although the preferred amounts of antioxidants are usually within the range of 0.25–0.5%, based on the weight of the rosin, smaller or larger quantities within the range of about 0.1–1% are included within the scope of the invention.

In the following example a representative method for the preparation of saponified rosin containing phenothiazine is described along with the results obtained by accelerating aging tests. It should be understood, however, that this example is given primarily for purposes of illustration and that the invention in its broader aspects is not limited thereto.

*Example*

Rosin size was prepared by heating at 200° F. a mixture of 500 grams of rosin, 65 grams of sodium hydroxide and sufficient water to make 70% solids. After 4 hours of heating a quantity of powdered phenothiazine was added and the mixture was stirred thoroughly to obtain a uniform distribution of the antioxidant. The heating was then continued for an additional two hours.

The resulting saponified rosin solution was dried on a polished drum drier heated with steam under 30 lbs. gage pressure and the dry product was scraped off in the form of thin flakes.

Batches were prepared containing 0.25%, 0.5% and 1% of phenothiazine, based on the weight of the rosin used in making the size. Another batch was made with no antioxidant for purposes of comparison. These sizes were tested by measuring their foaming index, since the tendency of a rosin size dispersion to foam is a measure of its degree of oxidation. The foaming index is determined by the following procedure:

To 20 cc. of a 5% aqueous solution of the size there is added 5 cc. of a 10% solution of $$Al_2(SO_4)_3 \cdot 14\ H_2O$$

and the mixture is poured into 180 cc. of water and agitated for 1 minute in a motor driven laboratory mixer. The dispersion is then poured into a 500 cc. graduate and the volume of foam is measured. The foaming index, expressed in per cent, is the ratio of the volume of the foam to the volume of liquid. It is found by the formula:

$$\frac{\text{Total volume (liquid + foam)} - 205}{205\ (\text{volume of liquid})} \times 100 = \text{foaming index}$$

This procedure was used to determine the foaming index of the sizes described above, both initially and after aging at 65° C. for 16 hours in a bomb in an atmosphere of pure oxygen under 50 lbs. gage pressure. It has been found that this procedure provides a good accelerated test for indicating the relative stability of the size to oxidation under normal aging conditions. The results are given in the following table:

| Antioxidant | Foaming Index | |
|---|---|---|
| | Before Aging | After Aging |
| 1% Phenothiazine | 2.3 | 29.2 |
| 0.5% Phenothiazine | 14.6 | 17.1 |
| 0.25% Phenothiazine | 9.8 | 12.2 |
| None | 2.2 | 90.3 |

What we claim is:

1. A dry rosin size composition consisting essentially of rosin size stabilized against oxidation by a content of from 0.1% to 1% of phenothiazine based on the weight of the rosin.

2. A dry rosin size composition consisting essentially of rosin size stabilized against oxidation by a content of from about 0.25% to about 0.5% of phenothiazine based on the weight of the rosin.

JUSTUS C. BARTHEL.
ARNOLD R. DAVIS.
EDWARD NICHOLS POOR.

REFERENCES CITED

The following references are of record in the file of this patent:

UNITED STATES PATENTS

| Number | Name | Date |
|---|---|---|
| 2,294,723 | Dreshfield | Sept. 1, 1942 |
| 2,308,691 | Hughes | Jan. 19, 1943 |